US012617549B2

(12) United States Patent
Witalis et al.

(10) Patent No.: US 12,617,549 B2
(45) Date of Patent: May 5, 2026

(54) AIRCRAFT ENGINE ANOMALY DETECTION BASED ON ODOR, SOUND, AND/OR IMAGE

(71) Applicant: RTX Corporation, Farmington, CT (US)

(72) Inventors: Stephen A. Witalis, Glastonbury, CT (US); Ramesh Rajagopalan, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 329 days.

(21) Appl. No.: 18/229,384

(22) Filed: Aug. 2, 2023

(65) Prior Publication Data

US 2024/0043137 A1      Feb. 8, 2024

Related U.S. Application Data

(60) Provisional application No. 63/395,154, filed on Aug. 4, 2022.

(51) Int. Cl.
| | |
|---|---|
| *B64D 45/00* | (2006.01) |
| *F02C 9/18* | (2006.01) |
| *G01M 15/14* | (2006.01) |
| *G07C 5/00* | (2006.01) |
| *G07C 5/08* | (2006.01) |

(52) U.S. Cl.
CPC ............... *B64D 45/00* (2013.01); *F02C 9/18* (2013.01); *G01M 15/14* (2013.01); *G07C 5/006* (2013.01); *G07C 5/0808* (2013.01); *F05D 2220/323* (2013.01); *F05D 2260/606* (2013.01); *F05D 2270/709* (2013.01)

(58) Field of Classification Search
CPC ... B64D 45/00; B64D 2045/0085; F02C 9/18; F02C 9/00; G01M 15/14; G07C 5/006; G07C 5/0808; F05D 2220/323; F05D 2260/606; F05D 2270/709
See application file for complete search history.

(56) References Cited

U.S. PATENT DOCUMENTS

| | | | |
|---|---|---|---|
| 8,843,348 B2 | 9/2014 | Pascu et al. | |
| 9,020,764 B2 | 4/2015 | Walte et al. | |
| 9,816,970 B2 | 11/2017 | Lacaille | |
| 10,704,734 B2 | 7/2020 | Ganiger et al. | |
| 2006/0142972 A1* | 6/2006 | Cancilla .................. | G07C 3/00 |
| | | | 702/183 |

(Continued)

FOREIGN PATENT DOCUMENTS

| | | | | |
|---|---|---|---|---|
| CN | 109424843 B | * | 2/2021 | ............. F01M 11/10 |
| CN | 114062511 A | | 2/2022 | |

(Continued)

*Primary Examiner* — Timothy P Graves
(74) *Attorney, Agent, or Firm* — CANTOR COLBURN LLP

(57) ABSTRACT

Examples described herein provide a method for aircraft engine anomaly detection based on an odor. The method includes receiving data indicative of the odor associated with an aircraft engine of an aircraft. The method further includes analyzing the data to determine whether an anomaly associated with the aircraft has occurred. The method further includes responsive to determining that an anomaly associated with the aircraft has occurred, implementing a corrective action based at least in part on the data.

15 Claims, 7 Drawing Sheets

(56) References Cited

U.S. PATENT DOCUMENTS

| | | | |
|---|---|---|---|
| 2015/0138342 A1 | 5/2015 | Brdar et al. | |
| 2017/0050750 A1* | 2/2017 | Barraci | G07C 5/0808 |
| 2020/0408106 A1 | 12/2020 | Karnofski et al. | |

FOREIGN PATENT DOCUMENTS

| | | | |
|---|---|---|---|
| JP | 104101648 A | 4/1992 | |
| WO | WO-2022084697 A1 * | 4/2022 | G05D 11/132 |

* cited by examiner

700

Receive Image Data Indicative Of A Image Associated With An Aircraft Engine Of An Aircraft

702

Analyze The Image Data To Determine Whether An Anomaly Associated With The Aircraft Has Occurred

704

Responsive To Determining That An Anomaly Associated With The Aircraft Has Occurred, Implement A Corrective Action Based At Least In Part On The Image Data

706

800

AIRCRAFT ENGINE ANOMALY DETECTION BASED ON ODOR, SOUND, AND/OR IMAGE

CROSS REFERENCE TO RELATED APPLICATIONS

This application claims priority to U.S. Provisional Application No. 63/395,154 filed Aug. 4, 2022, the entire contents of which are incorporated herein by reference thereto.

TECHNICAL FIELD

The subject matter disclosed herein generally relates to aircraft engines and particularly to aircraft engine anomaly detection.

BACKGROUND

Engines, such as gas turbine engines, hydroelectric turbine engines, and/or the like, can be used to provide thrust to aircraft and/or other types of vehicles. In some cases, such engines can include one or more sensors to detect anomalies occurring within the engine. For example, a temperature sensor can sense temperature within the engine (or within a section of the engine) and can indicate when an anomaly has occurred, such as the measured temperature exceeding a temperature threshold.

BRIEF DESCRIPTION

In one exemplary embodiment, a method aircraft engine anomaly detection based on an odor is provided. The method includes receiving data indicative of the odor associated with an aircraft engine of an aircraft. The method further includes analyzing the data to determine whether an anomaly associated with the aircraft has occurred. The method further includes responsive to determining that an anomaly associated with the aircraft has occurred, implementing a corrective action based at least in part on the data.

In addition to one or more of the features described herein, or as an alternative, further embodiments of the method may include that the data indicative of the odor is received from an odor detection sensor.

In addition to one or more of the features described herein, or as an alternative, further embodiments of the method may include that the data indicative of the odor is received from a plurality of odor detection sensors.

In addition to one or more of the features described herein, or as an alternative, further embodiments of the method may include that the plurality of odor detection sensors sample an airflow through the aircraft engine according to a schedule.

In addition to one or more of the features described herein, or as an alternative, further embodiments of the method may include updating the scheduled based on the data.

In addition to one or more of the features described herein, or as an alternative, further embodiments of the method may include that the data is current data, wherein analyzing the data comprises comparing the current data to historical data, and wherein an anomaly associated with the aircraft is determined to have occurred responsive to a change between the historical data and the current data.

In addition to one or more of the features described herein, or as an alternative, further embodiments of the method may include that analyzing the data comprises comparing the data to a threshold, and wherein an anomaly associated with the aircraft is determined to have occurred responsive to the data satisfying the threshold.

In addition to one or more of the features described herein, or as an alternative, further embodiments of the method may include that analyzing the data comprises classifying the odor using a machine learning model.

In addition to one or more of the features described herein, or as an alternative, further embodiments of the method may include training the machine learning model.

In addition to one or more of the features described herein, or as an alternative, further embodiments of the method may include that the aircraft engine is selected from a group consisting of a gas turbine engine, an electric engine, and a hybrid electric turbine engine.

In another exemplary embodiment a full authority digital control includes a memory including computer readable instructions and a processing device for executing the computer readable instructions. The computer readable instructions control the processing device to perform operations for aircraft engine anomaly detection based on a sound. The operations include receiving sound data indicative of the sound associated with an aircraft engine of an aircraft. The operations further include receiving odor data indicative of the odor associated with an aircraft engine of an aircraft. The operations further include analyzing the sound data and the odor data to determine whether an anomaly associated with the aircraft has occurred. The operations further include, responsive to determining that an anomaly associated with the aircraft has occurred, implementing a corrective action based at least in part on the sound data.

In addition to one or more of the features described herein, or as an alternative, further embodiments of the full authority digital engine control may include that the odor data indicative of the odor is received from an odor detection sensor, and wherein the sound data indicative of the sound is received from a sound detection sensor.

In addition to one or more of the features described herein, or as an alternative, further embodiments of the full authority digital engine control may include that the odor data indicative of the odor is received from a plurality of odor detection sensors, and wherein the sound data indicative of the sound is received from a plurality of sound detection sensors.

In addition to one or more of the features described herein, or as an alternative, further embodiments of the full authority digital engine control may include that the plurality of odor detection sensors sample an airflow through the aircraft engine according to a schedule, wherein the plurality of sound detection sensors sample the aircraft engine according to a schedule, and wherein the operations further comprise updating the scheduled based on the odor data and the sound data.

In addition to one or more of the features described herein, or as an alternative, further embodiments of the full authority digital engine control may include that analyzing the sound data comprises applying a machine learning model to infer a type of the anomaly.

In addition to one or more of the features described herein, or as an alternative, further embodiments of the full authority digital engine control may include that the odor data is current odor data, wherein analyzing the odor data comprises comparing the current odor data to historical odor data, wherein an anomaly associated with the aircraft is determined to have occurred responsive to a change between the historical odor data and the current odor data, wherein the sound data is current sound data, wherein analyzing the sound data comprises comparing the current sound data to historical sound data, and wherein an anomaly associated with the aircraft is determined to have occurred responsive to a change between the historical sound data and the current sound data.

In addition to one or more of the features described herein, or as an alternative, further embodiments of the full authority digital engine control may include that analyzing the sound odor data comprises comparing the odor data to an odor threshold, wherein analyzing the sound data comprises comparing the sound data to a sound threshold and a known signature sound profile, and wherein an anomaly associated with the aircraft is determined to have occurred responsive to the odor data satisfying the odor threshold and the sound data satisfying the sound threshold.

In yet another exemplary embodiment a computer program product comprising a computer readable storage medium having program instructions embodied therewith. The program instructions are executable by a processor to cause the processor to perform operations. The operations include receiving odor data indicative of an odor associated with an aircraft engine of an aircraft or receiving sound data indicative of a sound associated with the aircraft engine. The operations further include analyzing the odor data or the sound data to determine whether an anomaly associated with the aircraft has occurred. The operations further include, responsive to determining that an anomaly associated with the aircraft has occurred, receiving image data from an image sensor associated with aircraft. The operations further include analyzing the image data to verify the anomaly. The operations further include, responsive to verifying the anomaly, implementing a corrective action based at least in part on the odor data or the sound data.

In addition to one or more of the features described herein, or as an alternative, further embodiments of the computer program product may include that the odor data indicative of the odor is received from a plurality of odor detection sensors, wherein the plurality of odor detection sensors sample an airflow through the aircraft engine according to a schedule, and wherein the operations further comprise updating the scheduled based on the odor data, wherein the anomaly is an electrical fire, and wherein the corrective action is to activate a fire suppression system.

In addition to one or more of the features described herein, or as an alternative, further embodiments of the computer program product may include that the anomaly is volcanic ash being ingested into the aircraft engine, and wherein the corrective action is to open a bleed air port of the aircraft engine.

The above features and advantages, and other features and advantages, of the disclosure are readily apparent from the following detailed description when taken in connection with the accompanying drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
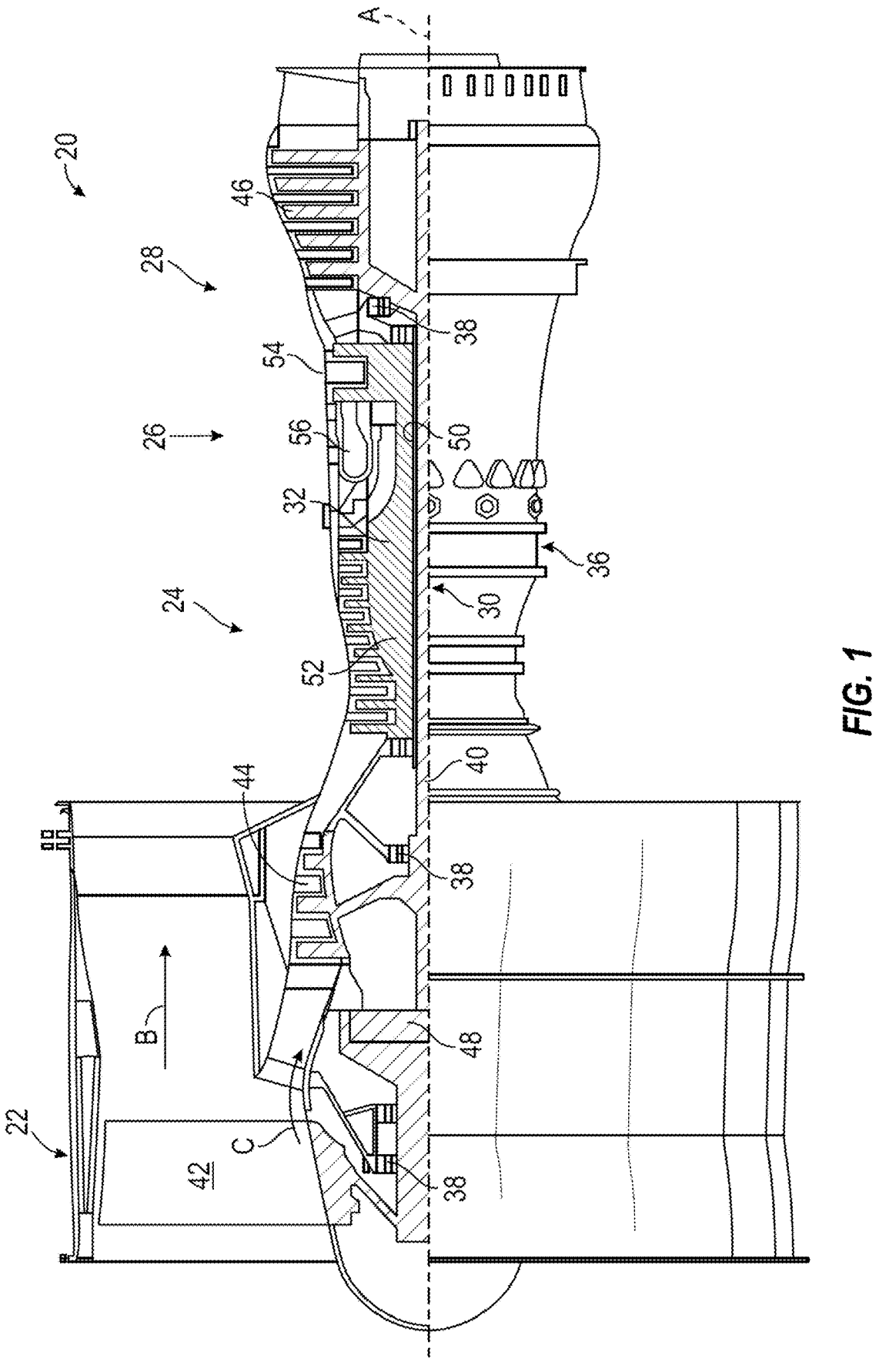
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption (' TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ ^\circ \ R)/(518.7^\circ \ R)]^{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
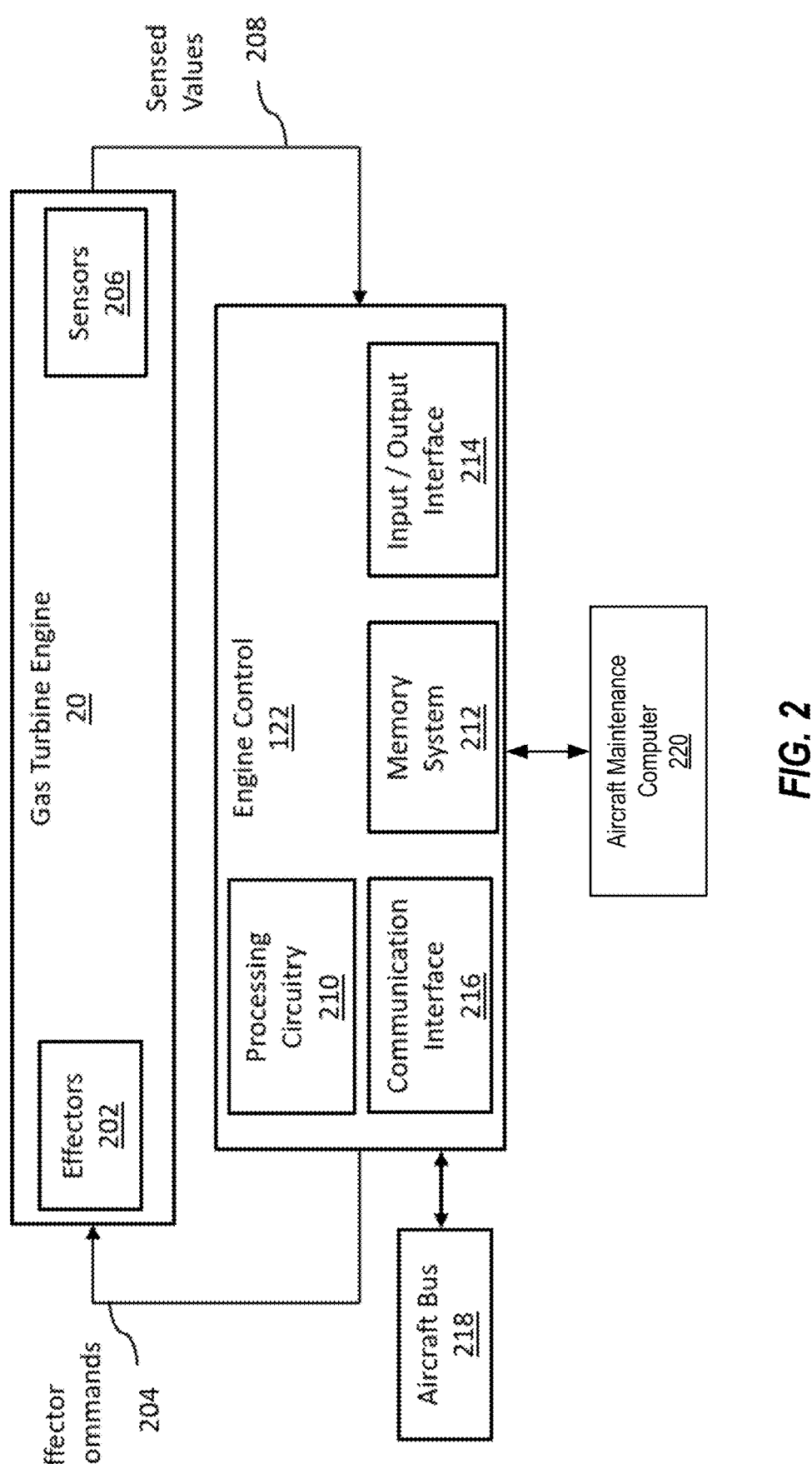
FIG. 2 is a block diagram of an example of an engine control configured to monitor and control operation of a gas turbine engine in real-time (or near-real time) according to one or more embodiments described herein.

FIG. 2 depicts an example of an engine control 122 configured to monitor and control operation of a gas turbine engine (e.g., the gas turbine engine 20) in real-time (or near-real time) according to one or more embodiments described herein. The engine control 122 can control effectors 202 of the gas turbine engine 20 by generating one or more effector commands 204. Examples of effectors 202 can include one or more motors, solenoids, valves, relays, pumps, heaters, and/or other such actuation control components. A plurality of sensors 206 can capture state data associated with the gas turbine engine 20 and provide sensed values 208 as feedback to the engine control 122 to enable closed-loop control of the gas turbine engine 20 according to one or more control laws. Examples of the sensors 206 can include one or more temperature sensors, pressure sensors, strain gauges, speed sensors, accelerometers, lube sensors, and the like.

The engine control 122 (also referred to as a "controller") can be a full authority digital engine control (FADEC) that includes processing circuitry 210 (also referred to as a "processing device") and a memory system 212 (also referred to as a "memory") configured to store a plurality of configuration items, where at least one of the configuration items includes a sequence of the computer executable instructions for execution by the processing circuitry 210. Other types of configuration items can include data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 20. The processing circuitry 210 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 212 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The engine control 122 can also include one or more of an input/output interface 214, a communication interface 216, and/or other elements. The input/output interface 214 can include support circuitry for interfacing with the effectors 202 and sensors 206, such as filters, amplifiers, digital-to-analog converters, analog-to-digital converters, and other such circuits to support digital and/or analog interfaces. Further, the input/output interface 214 can receive or output signals to/from other sources, such as discrete inputs/outputs and/or status signals. The communication interface 216 may communicate with an aircraft bus 218 of an aircraft. The aircraft bus 218 can provide aircraft-level parameters and commands that are used by the engine control 122 to control the gas turbine engine 20 in real-time. The communication interface 216 may also support communication with other components, such as other instances of the engine control 122, storage units, diagnostic units, communication adapters, off-board systems, and the like. For example, the communication interface 216 may support communication with an aircraft maintenance computer 220 to provide for communication between (e.g., transmitting commands/data to and/or receiving commands/data from) the engine control 122 and the aircraft maintenance computer 220.

The engine control 122 provides for, among other things, monitoring the gas turbine engine 20 based on data collected by the sensors 206. The gas turbine engine 20 is one example of an aircraft engine, and other examples are also possible, such as hybrid electric turbine engines. It may be desirable to monitor properties of the gas turbine engine 20, such as temperature, pressure, flow rate, etc. to detect problems, such as anomalies, with the gas turbine engine 20. Some anomies cannot be detected using conventional sensors, such as pressure or temperature, alone. However, some anomalies can produce odors (e.g., smells) that may indicate a problem has occurred, is occurring, or may occur or indicative of onset or an incipient of a potential problem with one more components or engine as a whole. Accordingly, it may be desirable to use one or more odor detection sensors for anomaly detection. According to one or more embodiments described herein, the sensors 206 can include an odor detection sensor to detect odor(s) generated by or within the gas turbine engine 20. That is, the engine control 122 can detect engine odors that can be used to detect and/or diagnose anomalies within the gas turbine engine 20 and/or air flow stream through the gas turbine engine 20. Examples of such anomalies include, but are not limited to, fuel leaks, lubricant leaks, burning rubber/insulation, heat generation due to metal to metal rubbing without lubrication, lubricant fire, electrical fires, and/or the like, including combinations and/or multiples thereof.

Figure 3:
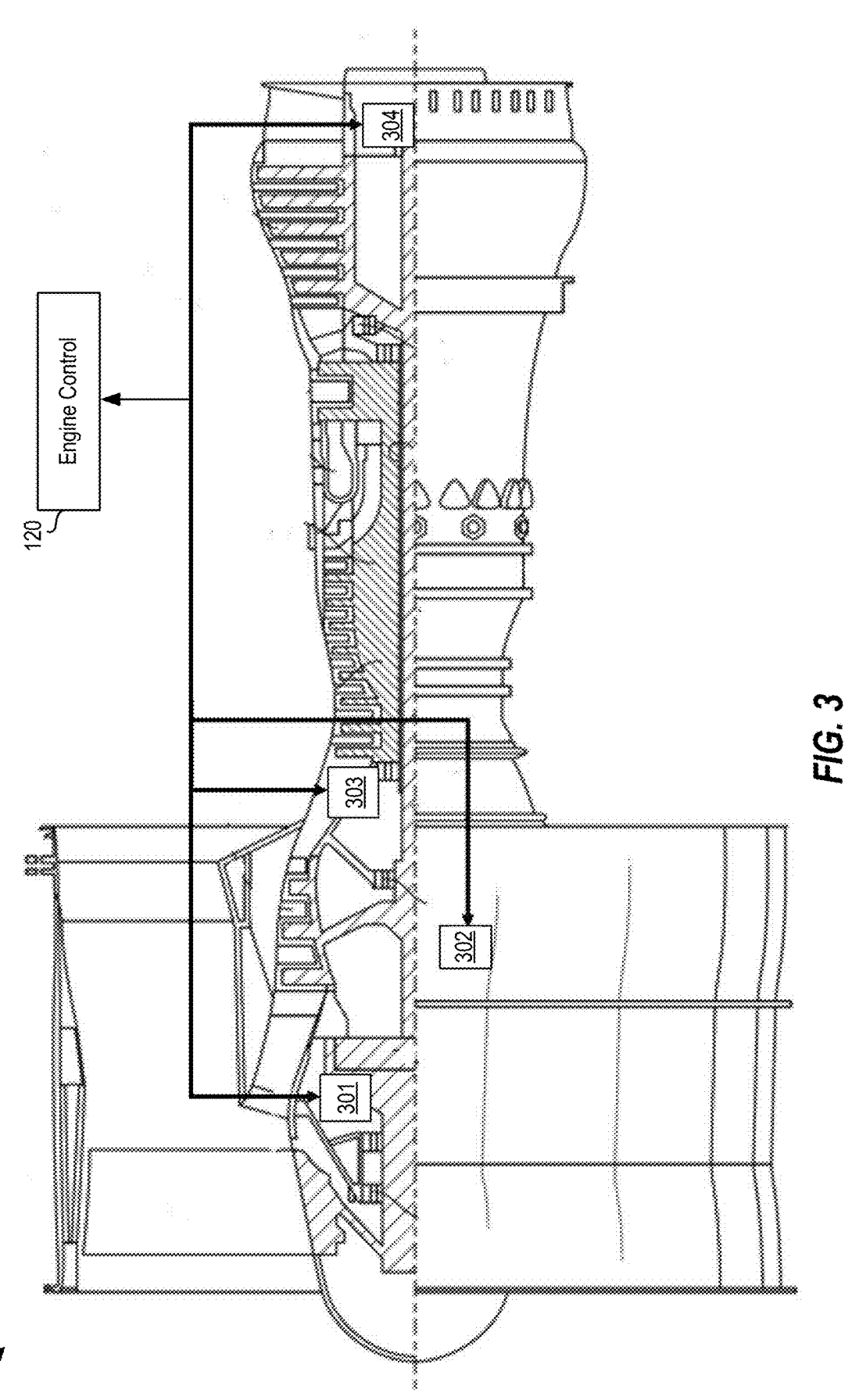
FIG. 3 is a block diagram of the gas turbine engine of FIGS. 1 and 2 having anomaly detection sensors according to one or more embodiments described herein.

One or more anomaly detection sensors (e.g., odor detection sensors, sound detection sensors, image sensors, and/or the like including combinations and/or multiples thereof) can be located within, on, and/or proximate to the gas turbine engine 20. For example, FIG. 3 is a block diagram of the gas turbine engine 20 having anomaly detection sensors 301, 302, 303, 304 according to one or more embodiments described herein. Although four anomaly detection sensors are shown in FIG. 3, other numbers of anomaly detection sensors can be implemented (e.g., one anomaly detection sensor, two anomaly detection sensors, five anomaly detection sensors, eight anomaly detection sensors, ten anomaly detection sensors, and/or the like, including combinations and/or multiples thereof). According to one or more embodiments described herein, the anomaly detection sensors 301-304 can be of one or more types, such as odor detection sensors, sound detection sensors, image sensors, and/or the like including combinations and/or multiples thereof. Odor detection sensors detect odors (e.g., burning), which can be analyzed to detect anomalies associated with different odors. Sound detection sensors can detect sounds (e.g., bearing failing), which can be analyzed to detect anomalies associated with different sounds. Image sensors, such as cameras, can detect images of components of an aircraft engine to detect anomalies (e.g., damage to a component), which can be analyzed to detect anomalies associated with different images. According to one or more embodiments described herein, odor data from odor detection sensors, sound data from sound detection sensors, and/or image data associated with image sensors can be used in any combination to detect and/or verify anomalies. The number and/or type of anomaly detection sensors can be determined based on a design of the gas turbine engine 20, based on the types of anomalies desired to be detected, and/or the like, including combinations and/or multiples thereof.

In the example of FIG. 3, the anomaly detection sensors 301-304 can be placed within the gas turbine engine 20 to monitor the engine air flow stream through the gas turbine engine 20 to monitor aspects (e.g., odor, sound, images) of the gas turbine engine 20 and to detect anomalies. For example, an odor detection sensor can detect burning gasses, for example, which may be caused by failing engine seals, failing rubber seals, hydraulic fluid leaks, fuel leaks, and/or the like, including combinations and/or multiples thereof. As another example, a sound detection sensor can detect engine sounds that could lead to early detection and isolation of issues within the engine, such as noises that could indicate issues such as bearing failing, thrust reverser system not responding to commands, engine actuators failing, air leaks, and/or the like including combinations and/or multiples thereof. As yet another example, an image sensor can detect similar issues to the sound and/or odor detection sensors (e.g., air leaks, ruptured pipes, hydraulic fluid leak, oil leak, engine actuator improperly moving, sticking, or erratic movement/behavior, objects ingested into the engine, and/or the like including combinations and/or multiples thereof) and/or can be used to verify an anomaly detected by an odor sensor and/or a sound sensor. The engine control 122, using data from the anomaly detection sensors 301-304, can detect when the gas turbine engine 20 is experiencing an anomaly in an engine and can classify the anomaly based on the detected odor data, sound data, and/or image data. The degradation can be detected during ground movement, taxi, and/or operational flight phases.

According to one or more embodiments described herein, sound detection sensors can, in some cases, be used in a security mode to detect voices in and/or around the gas turbine engine 20 when the aircraft is left unoccupied, such as after completion of a day's flight while the aircraft sits idle during the night. Similarly, according to one or more embodiments described herein, image sensors can, in some cases, be used in a security mode to detect activity in and/or around the gas turbine engine 20 when the aircraft is left unoccupied. Such an approach could be based on detection of certain types of pre-classified sounds. For example, a bump to an engine nacelle could enable an image sensor (e.g., a camera) to capture an image for analysis.

Data from the anomaly detection sensors 301-304 can be used as an "early warning" detection of anomalies. For example, in the case of odor detection sensors, the engine control 122 can, overtime, train a machine learning model to identify unique odor types associated with different anomalies as compared to a baseline (ground truth) nominal odor state. Similarly, the engine control 120 can train a machine learning model to identify unique frequencies of different engine mechanical components in a failed or failing state as compared to a baseline (ground truth) nominal sound state. As another example, the engine control 120 can train a machine learning model to detect unique images of different engine mechanical components in a failed or failing state as compared to a baseline (ground truth) nominal visual state.

As described herein, a neural network can be trained to detect anomalies of an aircraft engine based on odor, sound, and/or image. More specifically, the present techniques can incorporate and utilize rule-based decision making and artificial intelligence (AI) reasoning to accomplish the various operations described herein, namely detecting anomalies of an aircraft engine based on odor. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model can be used for detecting anomalies of an aircraft engine based on odor. In one or more embodiments, machine learning functionality can be implemented using an artificial neural network (ANN) having the capability to be trained to perform a currently unknown function, such as detecting and classifying an odor as indicating an aircraft engine anomaly. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANN (FNN) that are particularly useful at analyzing visual imagery.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. The learning rate can be adjusted for various types of odors as well as to avoid local minima. After being weighted and transformed by a function determined by the network's designer, the activation of these input neurons are then passed to other downstream neurons, which are often referred to as "hidden" neurons. This process is repeated until an output neuron is activated. The activated output neuron determines which character was read. It should be appreciated that these same techniques can be applied in the case of detecting anomalies of an aircraft engine based on odor. For example, odor data (e.g., chemical composition data) associated with various anomalies can be input into a machine learning algorithm and, over the course of multiple training cycles, parameters of the algorithm (e.g., weights, biases, etc.) can be adjusted to detect anomalies based on the input training data. The model can be tested against data other than the training data. Once trained (and optionally tested), the model can be deployed to perform inference, that is to detect anomalies of an aircraft engine based on odor using data collected by the anomaly detection sensors 301-304.

The placement of the anomaly detection sensors 301-304 can vary depending on engine type (e.g., military versus commercial engines, small versus large commercial engines, afterburning versus non-afterburning engines, and/or the like, including combinations and/or multiples thereof). Design of one or more of the anomaly detection sensors 301-304 can vary depending upon install location. In the example of FIG. 3, four anomaly detection sensors 301-304 are configured and arranged around the gas turbine engine 20 as shown. The anomaly detection sensors 301-304 can be sampled (e.g., by the engine control 122) at intervals (see, e.g., FIG. 4), on demand, and/or the like, including combinations and/or multiples thereof. According to one or more embodiments described herein, the anomaly detection sensors 301-304 are sampled at a one second sample interval rate between each sensor sample with a two-minute interval before resampling. Other intervals can also be implemented and can change over time, such as based on sensed conditions. Sensor sampling intervals/rates can vary depending upon installation configuration engine requirements, design configuration, and/or the like, including combinations and/or multiples thereof. Detection criteria can be based on two out of three samples within a defined period of another schema according to one or more embodiments described herein.

According to one or more embodiments described herein, one or more of the anomaly detection sensors 301-304 can be in wired and/or wireless communication with the engine control 122. Wiring associated with anomaly detection sensors 301-304 can vary due to engine placement location.

Upon the detection of an anomaly that may require maintenance or pilot intervention, a corrective action can be taken and/or an alert can be issued. For example, the pilot may change a power setting (e.g., a corrective action) for the gas turbine engine 20 responsive to one or more of the anomaly detection sensors 301, 302, 303, 304 detecting an anomaly (e.g., a hydraulic leak, failing bearing, and/or the like including combinations and/or multiples thereof). As another example, a fire suppression system can be activated responsive to one or more of the anomaly detection sensors 301, 302, 303, 304 detecting an anomaly (e.g., an electrical fire). Further, the engine control 122 can issue an alert, such as to the pilot and/or to maintenance crew, that an anomaly has been detected along with data about the anomaly.

The use of one or more of the anomaly detection sensors 301-304 can provide for one or more of the following: early detection of potential cabin odor; detection of slow and small oil leaks; detection of slow and small hydraulic leaks; detection of wear and tear or degrading of seals; detection of bearing surfaces operating without lubricant; detection of anomalies relating to engine pylon—electrical; detection of anomalies relating to aircraft brakes and tires; detection of biologic material ingested into the engine; detection of volcanic ash (useful for opening bleed air port or adjusting engine operation); detection of electrical problems (e.g., short circuit); detection of fire; failing bearing, thrust reverser system not responding to commands, engine actuators failing, early detection of air leaks, engine bolts fracturing, engine out of balance (e.g., excessive rubbing against the engine case), objects ingested into the engine, and/or the like, including combinations and/or multiples thereof.

In examples, some anomalies are detected based on instantaneous data measurements. For example, a fire can be detected as an instantaneous event using one or more of the anomaly detection sensors 301-304. For example, one or more of the anomaly detection sensors 301-304 can detect chemicals (e.g., odor) associated with electrical fires, and the detection of such chemicals known to be associated with fires indicates that a fire is present. In other examples, some anomalies are detected over time by comparing historical data. For example, slow oil leaks may be detected by detecting a small but increasing amount of odor associated with oil. Although a small amount of oil may initially be detected, that it and of itself may not indicate a leak (e.g., it may be below a threshold). However, if the amount of detected odor increases over time, the engine control 122 may determine that an oil leak is present due to the change over time. As another example, a vibration above a threshold or an increasing vibration over time may be indicative of a failing component of the gas turbine engine 20.

Figure 4:
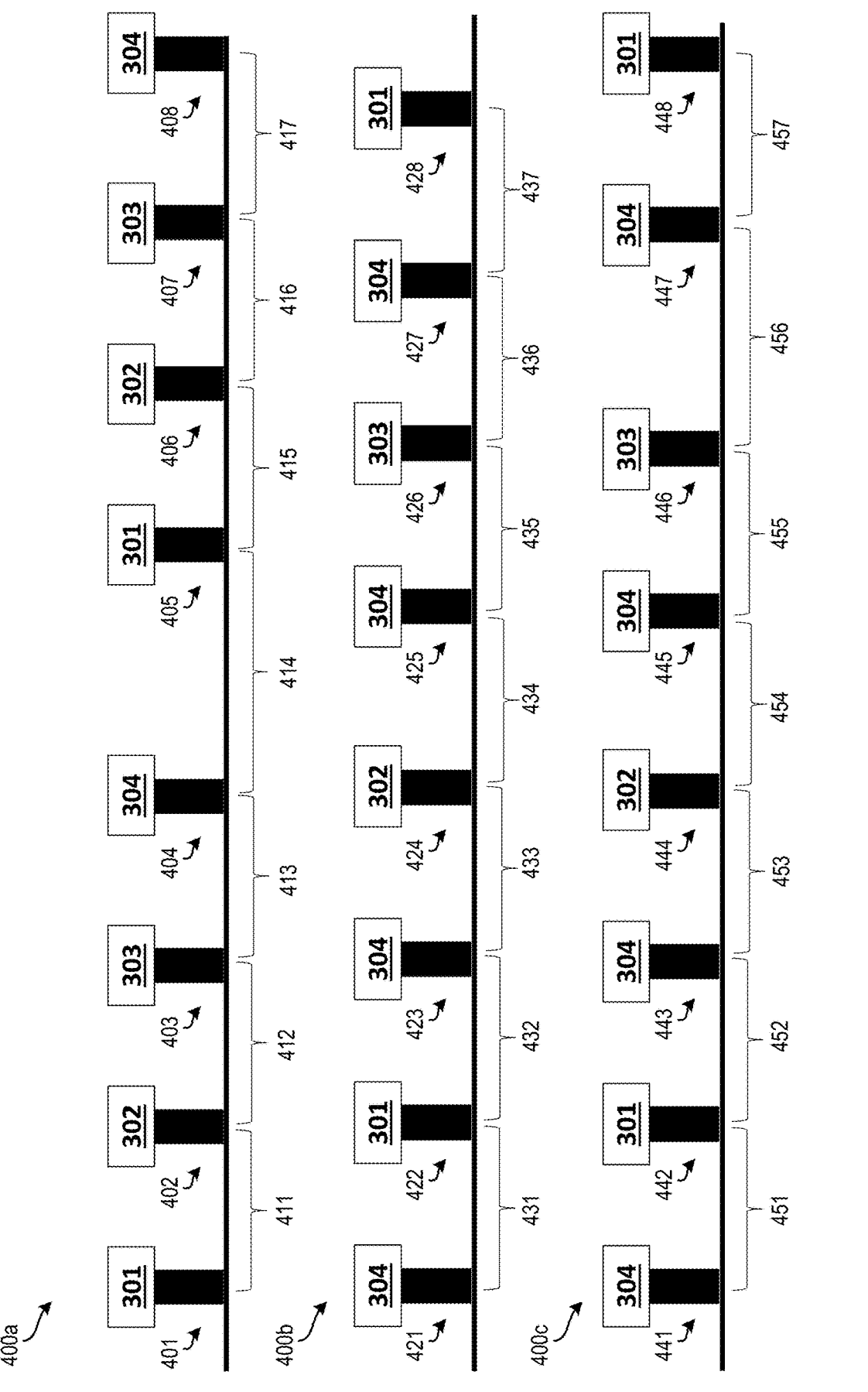
FIG. 4 shows timing diagrams for aircraft engine anomaly detection based on odor data, sound data, and/or image data according to one or more embodiments described herein.

According to one or more embodiments described herein, the anomaly detection sensors 301-304 can be sampled at the same time, at different times, randomly, according to a schedule, periodically, and/or the like, including combinations and/or multiples thereof. For example, FIG. 4 shows timing diagrams 400a, 400b, 400c for aircraft engine anomaly detection based on odor, sound, and/or image according to one or more embodiments described herein. It should be understood that the example timing diagrams 400a-400c of FIG. 4 are merely examples and other timing diagrams for sampling the anomaly detection sensors 301-304 are possible.

The timing diagram 400a shows a possible sampling sequence for collecting data using the anomaly detection sensors 301-304. The timing diagram 400a includes sampling points 401-408, which represent points associated with sampling each of the anomaly detection sensors 301-304. For example, at the sampling points 401, 405, the anomaly detection sensor 301 is sampled; at the sampling points 402, 406, the anomaly detection sensor 302 is sampled, etc. There can exist a period of time between each of the sampling points 401-408. For example, a period 411 exists between sampling points 401, 402; a period 412 exists between sampling points 402, 403; etc. In this example, the periods 411-413 make up a first cycle of sampling each of the odor detection sensors 301-304 while the periods 415-417 make up a second cycle of sampling each of the odor detection sensors 301-304. As an example, the periods 411, 412, 413, 415, 416, 417 are each substantially the same (e.g., 1 second). The period 414 can be substantially the same as the periods 411-413, 415-417 or can be longer or shorter. For example, the period 414 can represent a delay or waiting period between the first cycle and the second cycle.

The timing diagram 400b shows another possible sampling sequence for collecting data using the odor detection sensors 301-304. The timing diagram 400b includes sampling points 421-428 having periods 431-437 therebetween. According to this example, the odor detection sensor 304 is sampled at sampling points 421, 423, 425, 427 while the anomaly detection sensors 301, 302, 303 are each sampled at sampling points 422/428, 424, 426 respectively. The periods 431-437 can be substantially the same or can vary. The timing diagram 400c shows yet another possible sampling sequence for collecting data using the anomaly detection sensors 301-304. The timing diagram 400c includes sampling points 441-448 having periods 451-457 therebetween. According to this example, the odor detection sensor 304 is sampled at sampling points 421, 423, 425, 427 while the anomaly detection sensors 301, 302, 303 are each sampled at sampling points 422/428, 424, 426 respectively. The configurations of the timing diagrams 400b, 400c provide for sampling one of the odor detection sensors more frequently, for example. The periods 431-437 and/or the periods 451-457 can be substantially the same or can vary. For example, in the timing diagram 400b, each of the periods 431-437 are substantially the same (e.g., 1 second), while in the timing diagram 400b, each of the periods 451-455 and 457 are substantially the same (e.g., 1 second) and the period 456 is longer or shorter. For example, the period 456 can represent a delay or waiting period between the first cycle and the second cycle.

According to one or more embodiments described herein, an image sensor can be coupled with an odor detection sensor and/or a sound detection sensor to verify anomaly detection. For example, if an anomaly is detected based on odor and/or sound, an image sensor can be used to capture image data (e.g., one or more images) of a component (or components) of the gas turbine engine 20, and the image data can be used to verify whether the anomaly is present. For example, if an odor detection sensor detects the odors of smoke, an image can be captured using the image sensor, and the image can be analyzed (such as using a trained machine learning model) to determine whether smoke is present. This can prevent false alarms. As another example, the image data can be used to locate a source of the anomaly. For example, if an odor detection sensor detects the odor of smoke, an image can be captured using the image sensor, and the image can be analyzed (such as using a trained machine learning model) to determine where the smoke is within or relative to the gas turbine engine 20.

It should be appreciated that other timing diagrams (e.g., sequences for polling the anomaly detection sensors 301-304) are possible.

Figure 5:
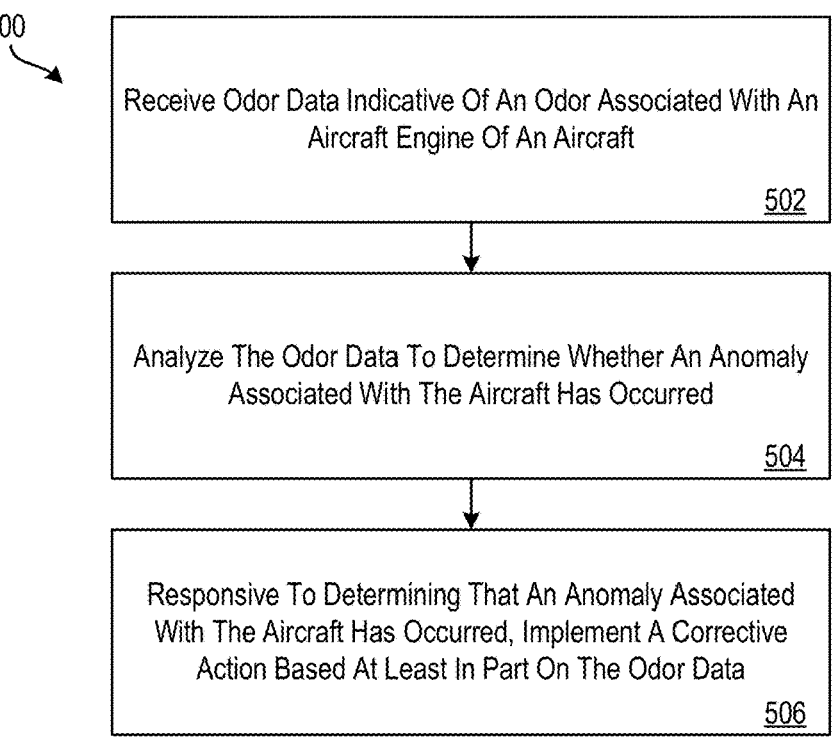
FIG. 5 is a flow diagram of a method for aircraft engine anomaly detection based on odor data according to one or more embodiments described herein.

FIG. 5 is a flow diagram of a method 500 for aircraft engine anomaly detection based on odor according to one or more embodiments described herein. The method 500 can be implemented using any suitable device, system, and/or the like, including combinations and/or multiples thereof. For example, the method 500 can be implemented by the engine control 122 (e.g., a FADEC) of FIGS. 2 and 3.

At block 502, the engine control 122 receives odor data indicative of an odor associated with an aircraft engine (e.g., a gas turbine engine, an electric engine, and a hybrid electric turbine engine) of an aircraft. According to an embodiment, the data indicative of the odor is received from an odor detection sensor (e.g., one of the anomaly detection sensors 301-304). According to an embodiment, the odor data indicative of the odor is received from a plurality of odor detection sensors (e.g., multiple of the anomaly detection sensors 301-304). According to an embodiment, the plurality of odor detection sensors sample an airflow through the aircraft engine according to a schedule (see, e.g., FIG. 4). According to one or more embodiments described herein, the sample can vary in terms of duration. As an example, the sample can be an instantaneous sample, while in another example, the sample can be taken over a period of time, where the period of time can vary in different cases. According to an embodiment, the schedule can be updated based on the odor data. For example, if the odor data indicates that an anomaly may be worsening (e.g., a slow leak), the schedule for sampling the odor detection sensors can be changed to increase sampling.

At block 504, the engine control 122 analyzes the odor data to determine whether an anomaly associated with the aircraft has occurred. According to an embodiment, the odor data is current odor data, and analyzing the odor data includes comparing the current odor data to historical odor data. In such an example, an anomaly associated with the aircraft is determined to have occurred responsive to a change between the historical odor data and the current odor data. In some cases, the change is indicative of an anomaly when the change is greater than some amount (e.g., a threshold amount, a percentage amount, a rate of change, etc.). According to an example, analyzing the odor data includes comparing the odor data to a threshold. In such an example, an anomaly associated with the aircraft is determined to have occurred responsive to the odor data satisfying the threshold (e.g., the data exceeding the threshold), responsive to the odor data matching a known signature odor profile, and/or the like, including combinations and/or multiples thereof. According to one or more embodiments, the analyzing can be performed using a machine learning model as described herein, such as to classify the odor (e.g., fire, oil leak, etc.). In such cases, the method 500 may further include training the machine learning model.

At block 506, responsive to determining that an anomaly associated with the aircraft has occurred, the engine control 122 implements a corrective action based at least in part on the odor data. For example, if the anomaly is a fire, the corrective action can be to activate a fire suppression system. As another example, the corrective action can be changing a power setting aircraft engine responsive to detecting an anomaly (e.g., a hydraulic leak). According to an embodiment, the method 500 can further include sending an alert upon the detection of an anomaly.

Additional processes also may be included, and it should be understood that the process depicted in FIG. 5 represents an illustration, and that other processes may be added or existing processes may be removed, modified, or rearranged without departing from the scope of the present disclosure.

Figure 6:
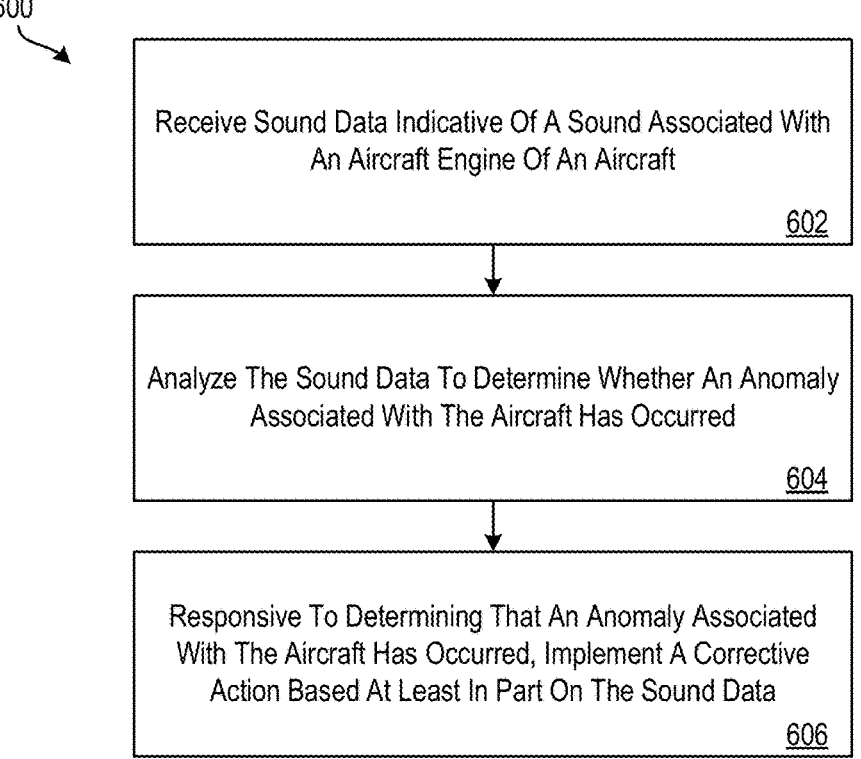
FIG. 6 is a flow diagram of a method for aircraft engine anomaly detection based on sound data according to one or more embodiments described herein.

FIG. 6 is a flow diagram of a method 600 for aircraft engine anomaly detection based on sound according to one or more embodiments described herein. The method 600 can be implemented using any suitable device, system, and/or the like, including combinations and/or multiples thereof. For example, the method 600 can be implemented by the engine control 122 (e.g., a FADEC) of FIGS. 2 and 3.

At block 602, the engine control 122 receives sound data indicative of a sound associated with an aircraft engine (e.g., a gas turbine engine, an electric engine, and a hybrid electric turbine engine) of an aircraft. According to an embodiment, the sound data indicative of the sound is received from a sound detection sensor (e.g., one of the anomaly detection sensors 301-304). According to an embodiment, the sound data indicative of the sound is received from a plurality of sound detection sensors (e.g., multiple of the anomaly detection sensors 301-304). According to an embodiment, the plurality of sound detection sensors sample one or more components within or associated with the aircraft engine according to a schedule (see, e.g., FIG. 4). According to one or more embodiments described herein, the sample can vary in terms of duration. As an example, the sample can be an instantaneous sample, while in another example, the sample can be taken over a period of time, where the period of time can vary in different cases. According to an embodiment, the schedule can be updated based on the sound data. For example, if the sound data indicates that an anomaly may be worsening (e.g., a slow leak), the schedule for sampling the sound detection sensors can be changed to increase sampling.

At block 604, the engine control 122 analyzes the sound data to determine whether an anomaly associated with the aircraft has occurred. According to an embodiment, the sound data is current sound data, and analyzing the sound data includes comparing the current sound data to historical sound data. In such an example, an anomaly associated with the aircraft is determined to have occurred responsive to a change between the historical sound data and the current sound data. In some cases, the change is indicative of an anomaly when the change is greater than some amount (e.g., a threshold amount, a percentage amount, a rate of change, etc.). According to an example, analyzing the sound data includes comparing the sound data to a threshold. In such an example, an anomaly associated with the aircraft is determined to have occurred responsive to the sound data satisfying the threshold (e.g., the data exceeding the threshold), responsive to the sound data matching a known signature sound profile, and/or the like, including combinations and/or multiples thereof. According to one or more embodiments, the analysis can be performed using a machine learning model as described herein, such as to classify the sound (e.g., air leak, bearing failing, etc.). In such cases, the method 600 may further include training the machine learning model.

At block 606, responsive to determining that an anomaly associated with the aircraft has occurred, the engine control

122 implements a corrective action based at least in part on the sound data. For example, if the anomaly is an object ingested into the engine, the corrective action can be to disable the engine (e.g., to turn off the engine). As another example, the corrective action can be changing a power setting aircraft engine responsive to detecting an anomaly (e.g., a hydraulic leak). According to an embodiment, the method 600 can further include sending an alert upon the detection of an anomaly.

According to one or more embodiments described herein, sound data from a flight can be compared, post flight or in real-time, to sound data from one or more prior flights as well as across other engines (e.g., from other aircraft) to detect anomalies and/or to train (e.g., retrain or update) a machine learning model.

Additional processes also may be included, and it should be understood that the process depicted in FIG. 6 represents an illustration, and that other processes may be added or existing processes may be removed, modified, or rearranged without departing from the scope of the present disclosure.

Figure 7:
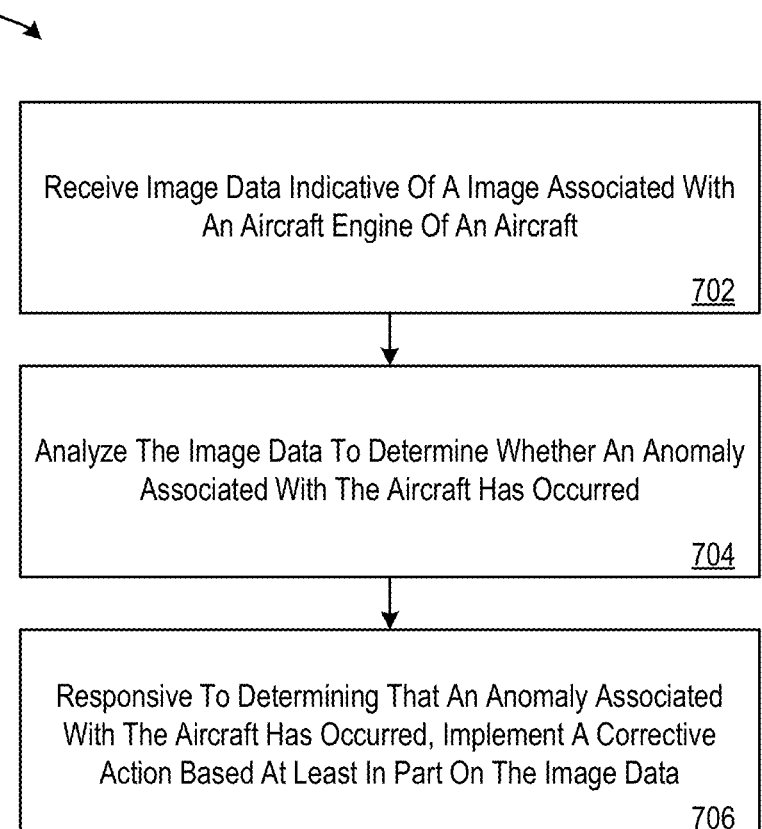
FIG. 7 is a flow diagram of a method for aircraft anomaly detection based on image data according to one or more embodiments described herein.

FIG. 7 is a flow diagram of a method 700 for aircraft engine anomaly detection based on image according to one or more embodiments described herein. The method 700 can be implemented using any suitable device, system, and/or the like, including combinations and/or multiples thereof. For example, the method 700 can be implemented by the engine control 122 (e.g., a FADEC) of FIGS. 2 and 3.

At block 702, the engine control 122 receives image data (e.g., one or more images) indicative of an anomaly associated with an aircraft engine (e.g., a gas turbine engine, an electric engine, and a hybrid electric turbine engine) of an aircraft. According to an embodiment, the image data indicative of the anomaly is received from an image sensor (e.g., one of the anomaly detection sensors 301-304). According to an embodiment, the image data is received from a plurality of image sensors (e.g., multiple of the anomaly detection sensors 301-304). According to an embodiment, the plurality of image sensors sample one or more components within or associated with the aircraft engine according to a schedule (see, e.g., FIG. 4). According to an embodiment, the schedule can be updated based on the image data. For example, if the image data indicates that an anomaly may be worsening (e.g., a slow leak), the schedule for sampling the image sensors can be changed to increase sampling.

At block 704, the engine control 122 analyzes the image data to determine whether an anomaly associated with the aircraft has occurred. According to an embodiment, the image data is current image data, and analyzing the image data includes comparing the current image data to historical image data. In such an example, an anomaly associated with the aircraft is determined to have occurred responsive to a change between the historical image data and the current image data. In some cases, the change is indicative of an anomaly when the change is greater than some amount (e.g., a threshold amount, a percentage amount, a rate of change, etc.). According to one or more embodiments, analyzing the image data includes comparing the image data to a threshold. In such an example, an anomaly associated with the aircraft is determined to have occurred responsive to the image data indicating that a current state differs from a predefined state (e.g., a ground truth state). According to one or more embodiments, the analyzing can be performed using a machine learning model as described herein, such as to classify the image (e.g., fire, bearing failing, etc.). In such cases, the method 600 may further include training the machine learning model.

At block 706, responsive to determining that an anomaly associated with the aircraft has occurred, the engine control 122 implements a corrective action based at least in part on the image data. For example, if the anomaly is an object ingested into the engine, the corrective action can be to disable the engine (e.g., to turn off the engine, or take other actions). As another example, the corrective action can be changing a power setting aircraft engine responsive to detecting an anomaly (e.g., a hydraulic leak). According to an embodiment, the method 700 can further include sending an alert upon the detection of an anomaly.

According to one or more embodiments described herein, image data from a flight can be compared, post flight or in real-time, to image data from one or more prior flights as well as across other engines (e.g., from other aircraft) to detect anomalies and/or to train (e.g., retrain or update) a machine learning model.

Additional processes also may be included, and it should be understood that the process depicted in FIG. 7 represents an illustration, and that other processes may be added or existing processes may be removed, modified, or rearranged without departing from the scope of the present disclosure.

Figure 8:
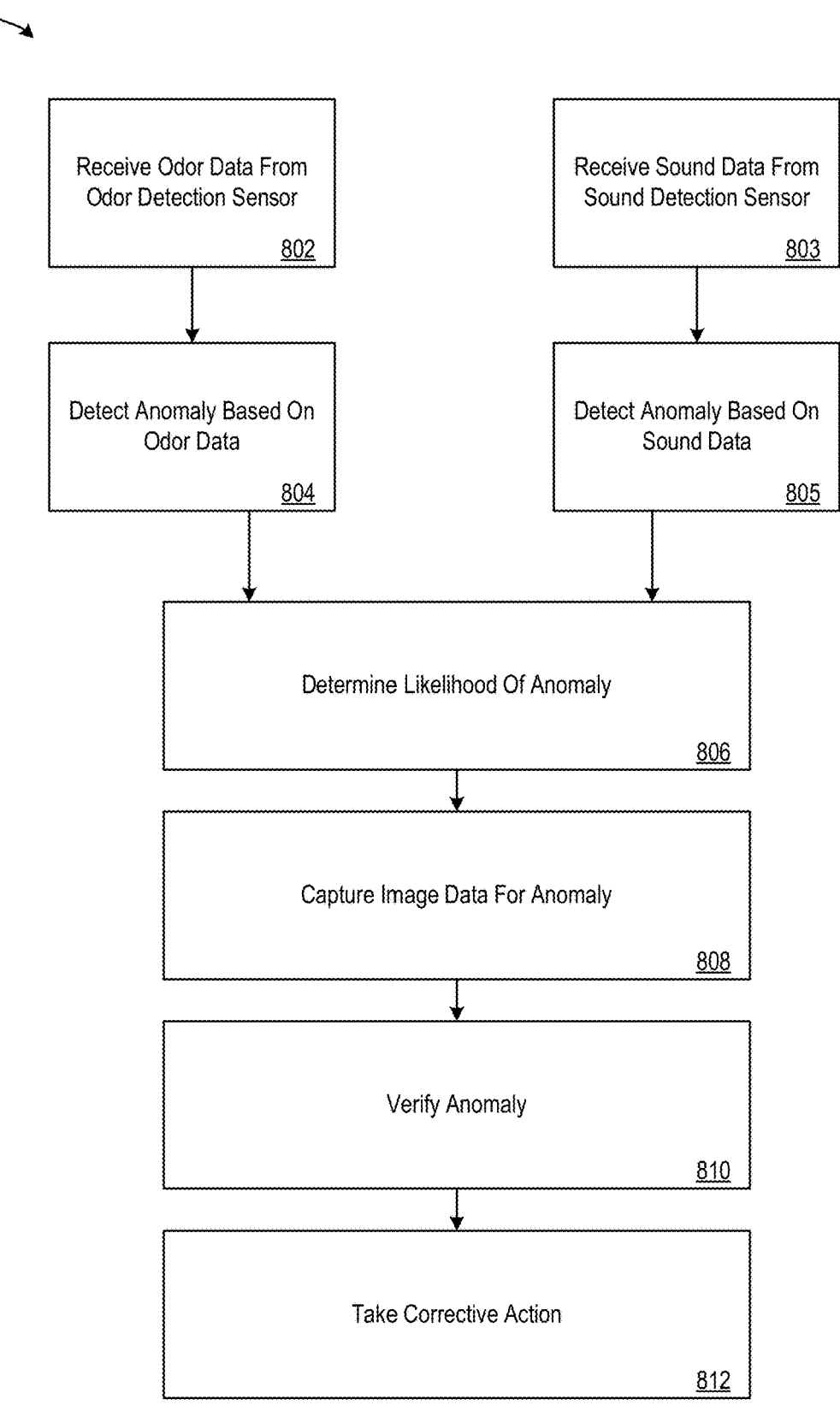
FIG. 8 is a flow diagram of a method for aircraft anomaly detection based on odor data and/or sound data and verifying the anomaly using image data according to one or more embodiments described herein.

FIG. 8 is a flow diagram of a method 800 for aircraft engine anomaly detection based on odor and/or sound data in combination with image data according to one or more embodiments described herein. The method 800 can be implemented using any suitable device, system, and/or the like, including combinations and/or multiples thereof. For example, the method 800 can be implemented by the engine control 122 (e.g., a FADEC) of FIGS. 2 and 3.

At block 802, the engine control 122 receives odor data from an odor detection sensor as described herein. At block 804, the engine control 122 detects an anomaly for the aircraft engine based on the odor data as described herein.

At block 803, the engine control 122 receives sound data from a sound detection sensor as described herein. At block 805, the engine control 122 detects an anomaly for the aircraft engine based on the sound data as described herein.

According to an embodiment, the blocks 802 and 804 can be performed without performing the blocks 803 and 805. According to an embodiment, the blocks 803 and 805 can be performed without performing the blocks 802 and 804. According to one or more embodiments described herein, the blocks 802 and 803 can be performed simultaneously, concurrently, or at different times. According to one or more embodiments described herein, the blocks 804 and 805 can be performed simultaneously, concurrently, or at different times.

At block 806, the engine control 122 determines a likelihood of an anomaly. For example, if the odor data indicates a slight elevation of odor data but does not meet a threshold, the engine control 122 may determine that the anomaly is not likely to occur. Conversely, if the odor data indicates an increase above the threshold, the engine control 122 may determine that the anomaly is likely to occur. A similar approach can be undertaken for sound data.

At block 808, after determining that the anomaly is likely to occur at block 806, image data for the anomaly is captured. For example, if sound data indicates a vibration associated with an actuator improperly moving, sticking, or erratic movement, an image sensor can capture an image of the actuator.

At block 810, the engine control 122 can verify the anomaly. For example, the engine control 122 can compare the image data to baseline image data as described herein. The engine control 122 can apply a machine learning model, for example, to detect whether the actuator improperly moved, stuck, or moved erratically to verify the anomaly. If the anomaly is verified at block 810, the engine control 122 can implement a corrective action as described herein. However, if the anomaly is not verified at block 810, a machine learning model for the sound data and/or the odor data can be updated according to one or more embodiments described herein. The method 800 can loop back to blocks 802, 803 and restart according to one or more embodiments described herein.

Additional processes also may be included, and it should be understood that the process depicted in FIG. 8 represents an illustration, and that other processes may be added or existing processes may be removed, modified, or rearranged without departing from the scope of the present disclosure.

One or more embodiments described herein can be applied not only to the gas turbine engine 20 shown in FIGS. 1-3 but to other types of engines as well, such as commercial aircraft engines, military aircraft engines, auxiliary power units for aircraft, hybrid electric turbine engines, electric engines, and/or the like, including combinations and/or multiples thereof, including engines that user other sources of power, such as steam, hydrogen, and/or another type of alternative fuel. For example, one or more embodiments described herein can be used to detect water leaks for hydrogen engines. As another example, one or more embodiments described herein can be used to detect steam leaks for hydrogen engines. As yet another example, one or more embodiments described herein can be used to detect electrical shorts and/or wires burning from electric engine components (e.g., motors, amplifiers, transformers, batteries, and/or the like, including combinations and/or multiples thereof) due to overheat off-gassing for example for electric and/or hybrid electric engines. As yet another example, one or more embodiments described herein can be used to detect an object entering (e.g., being ingested into) or exiting (e.g., being expelled from) an engine. As yet another example, one or more embodiments described herein can be used to detect electrical motor gearing issues, grinding noises, bearing issues, and/or the like including combinations and/or multiples thereof.

It should be appreciated that one or more embodiments described herein provide for improving the functioning of aircraft and thus improve aircraft technology. For example, the techniques described herein provide for detecting anomalies in aircraft engines based on odor, sound, and/or image, which can lead to earlier and/or more accurate detection of anomalies, resulting in corrective actions being implemented. This provides for improved anomaly detection and troubleshooting. One or more embodiments described herein also provide for correcting detected anomalies by implementing corrective actions directed to correcting the anomaly as described herein.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for aircraft engine anomaly detection based on an odor, the method comprising:

receiving from at least one odor detection sensor data indicative of the odor associated with an aircraft engine of an aircraft, the at least one odor detection sensor configured to sample an airflow through the aircraft engine according to a schedule;

analyzing the data to determine whether an anomaly associated with the aircraft has occurred;

responsive to determining that an anomaly associated with the aircraft has occurred, implementing a corrective action based at least in part on the data; and updating the schedule based on the data.

2. The method of claim 1, wherein the data indicative of the odor is received from a plurality of odor detection sensors.

3. The method of claim 1, wherein the data is current data, wherein analyzing the data comprises comparing the current data to historical data, and wherein an anomaly associated with the aircraft is determined to have occurred responsive to a change between the historical data and the current data.

4. The method of claim 1, wherein analyzing the data comprises comparing the data to a threshold, and wherein an anomaly associated with the aircraft is determined to have occurred responsive to the data exceeding the threshold.

5. The method of claim 1, wherein analyzing the data comprises classifying the odor using a machine learning model.

6. The method of claim 5, further comprising training the machine learning model.

7. The method of claim 1, wherein the aircraft engine is selected from a group consisting of a gas turbine engine, an electric engine, and a hybrid electric turbine engine.

8. A full authority digital engine control comprising:

a memory comprising computer readable instructions; and a processing device for executing the computer readable instructions, the computer readable instructions controlling the processing device to perform operations for aircraft engine anomaly detection based on a sound, the operations comprising:

receiving from at least one sound detection sensor sound data indicative of the sound associated with an aircraft engine of an aircraft, at least one sound detection sensor configured to sample the aircraft engine according to a sound detection schedule;

receiving odor from at least one odor detection sensor data indicative of the odor associated with an aircraft engine of an aircraft, the at least one odor detection sensor configured to sample an airflow through the aircraft engine according to an odor detection schedule;

analyzing the sound data and the odor data to determine whether an anomaly associated with the aircraft has occurred;

responsive to determining that an anomaly associated with the aircraft has occurred, implementing a corrective action based at least in part on the sound data; and updating the odor detection schedule based on the odor data, and the sound detection schedule based on the sound data.

9. The full authority digital engine control of claim 8, wherein the odor data indicative of the odor is received from a plurality of odor detection sensors, and wherein the sound data indicative of the sound is received from a plurality of sound detection sensors.

10. The full authority digital engine control of claim 8, wherein analyzing the sound data comprises applying a machine learning model to infer a type of the anomaly.

11. The full authority digital engine control of claim 8, wherein the odor data is current odor data, wherein analyzing the odor data comprises comparing the current odor data to historical odor data, wherein an anomaly associated with the aircraft is determined to have occurred responsive to a change between the historical odor data and the current odor data, wherein the sound data is current sound data, wherein analyzing the sound data comprises comparing the current sound data to historical sound data, and wherein an anomaly associated with the aircraft is determined to have occurred responsive to a change between the historical sound data and the current sound data.

12. The full authority digital engine control of claim 8, wherein analyzing the odor data comprises comparing the odor data to an odor threshold, wherein analyzing the sound data comprises comparing the sound data to a sound threshold and a known signature sound profile, and wherein an anomaly associated with the aircraft is determined to have occurred responsive to the odor data exceeding the odor threshold and the sound data exceeding the sound threshold.

13. A non-transitory computer program product comprising a computer readable storage medium having program instructions embodied therewith, the program instructions executable by a processor to cause the processor to perform operations comprising:

receiving from at least one odor detection sensor odor data indicative of an odor associated with an aircraft engine of an aircraft and receiving sound data indicative of a sound associated with the aircraft engine, the at least one odor detection sensor configured to sample an airflow through the aircraft engine according to a schedule;

analyzing the odor data or the sound data to determine whether an anomaly associated with the aircraft has occurred;

responsive to determining that an anomaly associated with the aircraft has occurred, receiving image data from an image sensor associated with aircraft;

analyzing the image data to verify the anomaly;

responsive to verifying the anomaly, implementing a corrective action based at least in part on the odor data or the sound data; and updating the schedule based on the odor data.

14. The non-transitory computer program product of claim 13, wherein the anomaly is an electrical fire, and wherein the corrective action is to activate a fire suppression system.

15. The non-transitory computer program product of claim 14, wherein the anomaly is volcanic ash being ingested into the aircraft engine, and wherein the corrective action is to open a bleed air port of the aircraft engine.

\* \* \* \* \*